United States Patent
Hagerman

(10) Patent No.: US 6,752,551 B1
(45) Date of Patent: Jun. 22, 2004

(54) VERTICALLY EXPANDABLE KEYBOARD

(75) Inventor: William Ernest Hagerman, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/331,868

(22) Filed: Dec. 30, 2002

(51) Int. Cl.[7] .................................................. B41J 5/14
(52) U.S. Cl. ...................................... 400/488; 400/492
(58) Field of Search ................................ 400/488, 490, 400/491.1, 492

(56) References Cited

U.S. PATENT DOCUMENTS

| | | | | |
|---|---|---|---|---|
| 4,563,550 A | * | 1/1986 | Bertina | 200/5 A |
| 4,597,681 A | * | 7/1986 | Hodges | 400/488 |
| 5,274,217 A | * | 12/1993 | Kilian | 235/145 R |
| 5,564,844 A | * | 10/1996 | Patterson et al. | 400/492 |
| 5,735,618 A | * | 4/1998 | Gluskoter et al. | 400/472 |
| 6,151,012 A | * | 11/2000 | Bullister | 345/168 |
| 6,256,018 B1 | * | 7/2001 | Zarek | 345/168 |

FOREIGN PATENT DOCUMENTS

| | | | | |
|---|---|---|---|---|
| JP | 57097138 A | * | 6/1982 | G06F/3/02 |
| JP | 01163935 A | * | 6/1989 | H01H/13/04 |
| JP | 01306909 A | * | 12/1989 | G06F/3/02 |

* cited by examiner

*Primary Examiner*—Andrew H. Hirshfeld
*Assistant Examiner*—Dave A. Ghatt

(57) ABSTRACT

A vertically expandable keyboard includes keys arranged in a plurality of rows. The keyboard has a retracted configuration wherein the rows are generally coplanar with each other and an extended configuration wherein at least some of the rows of keys in the home position are extended from the retracted configuration such that the rows are not coplanar with other rows. In the extended configuration, the rows can be sequentially tiered such that each row is higher than the preceding row moving from the front row to the back row. The keyboard includes lifters for lifting the rows of keys to the extended configuration. The keyboard can be part of an electronic device such as a portable computer.

14 Claims, 4 Drawing Sheets

VERTICALLY EXPANDABLE KEYBOARD

BACKGROUND OF THE INVENTION

The present invention relates to a keyboard for entering alphanumeric information, and more particularly to a keyboard having one or more rows of keys which extend vertically to a raised position which is higher than the preceding row.

Keyboards are used to input alphanumeric information into electronic devices including computers. Typical keyboards include a fairly standardized arrangement of several rows of keys, each key representing a letter, number, control character such as tabs, spaces, backspaces, etc and an enter key often used to enter a carriage return. Function keys are often used to provide control functions to the electronic device and can be labeled F1, F2, etc.

Keyboard keys are typically moved between a home position and a struck position when used to enter information. In the home position, the keyboard key is usually disposed at the highest vertical extension. To enter the symbol or control function associated with that key, the key is struck or depressed by the user and the key moves downwards from the home position to the struck position. Upon reaching the struck position, a signal is sent to the electronic device indicating that the key has been struck. Keyboard keys are biased, often by a spring, to return to the home position after being struck so that they are ready to be struck again.

Some stationary keyboards, that is, keyboards that are not adapted for mobility, have keys arranged in rows that are not co-planar. As shown in FIG. 1, these keyboards 10 have keys 12 arranged in rows 14a–14n, which are tiered so that each row is not co-planar with the other rows. Some keyboards have a sequentially tiered configuration in which each row is higher than the row immediately in front of it. A tiered row arrangement, especially a sequentially tiered row arrangement can provide improved ergonomics, enabling a user to strike the keys 12 easier and faster, and reducing mistakes and fatigue.

However, portable keyboards, such as keyboards used with portable electronic devices are often covered, or folded when the device is not in use. For example, as shown in FIG. 2, portable computers 16 usually have a display screen 18 which folds over the keyboard 19 providing a space efficient outer cover protecting the keyboard from damage. These portable electronic devices typically have keyboards with keys arranged in rows which are co-planar with each other and thus do not provide ergonomic benefits of the tiered keyboards mentioned above. It is desirable to provide a tiered keyboard for a portable electronic device that is space efficient and can be covered for protection.

SUMMARY OF THE INVENTION

According to the present invention, a keyboard is provide having a plurality of vertically extendable rows of keys.

In accordance with one aspect of the present invention, the keyboard includes keys arranged in a plurality of rows. The keyboard has a retracted configuration wherein the rows are generally coplanar with each other and an extended configuration wherein at least some of the rows of keys in the home position are extended from the retracted configuration such that the rows are not coplanar with other rows.

In accordance with a second aspect of the invention, the rows are sequentially tiered in the extended configuration such that each row is higher than the preceding row moving from the front row to the back row.

In accordance with another aspect of the invention, the keyboard includes lifters for lifting the rows of keys to the extended configuration.

In accordance with yet another aspect of the invention, the keyboard is part of an electronic device such as a portable computer.

The advantages and benefits of the present invention will become apparent to those of ordinary skill in the art upon reading and understanding the following detailed description of the preferred embodiments.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein.

DETAILED DESCRIPTION OF THE INVENTION

It is to be understood that the specific devices and processes illustrated in the attached drawings, and described in the following specification are simply exemplary embodiments of the inventive concepts defined in the appended claims. Hence, specific examples and characteristics relating to the embodiments disclosed herein are not to be considered as limiting, unless the claims expressly state otherwise.

Figure 1:
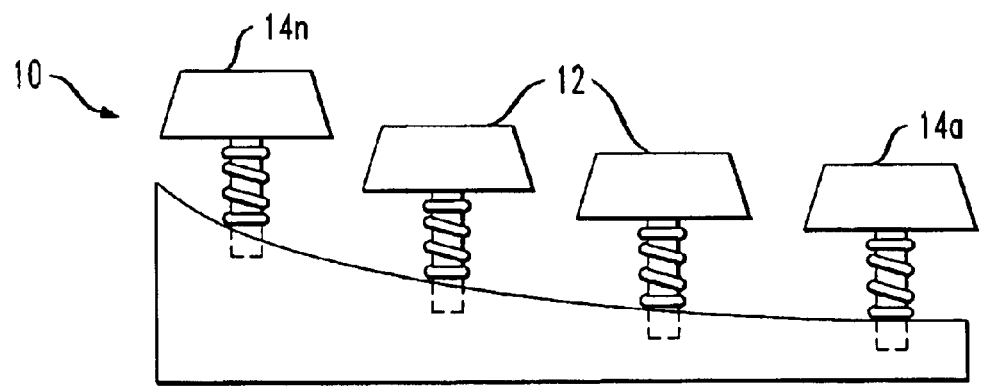
FIG. 1 is side view diagram illustrating a prior art stationary keyboard having tiered rows of keys.
Figure 2:
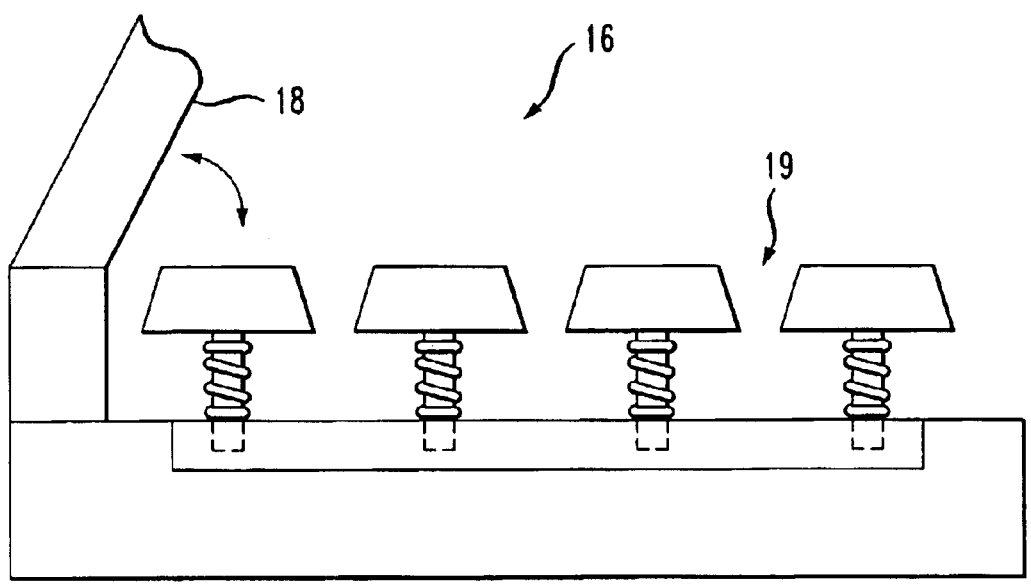
FIG. 2 is a side view diagram illustrating a known keyboard having co-planar rows of keys for use with a portable electronic device.
Figure 3:
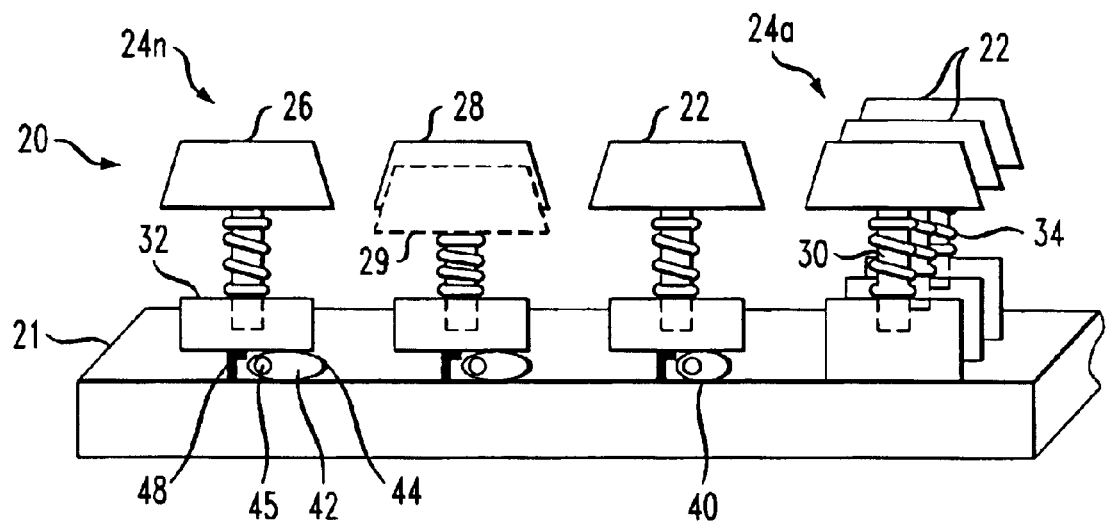
FIG. 3 is side view diagram illustrating a keyboard in accordance with the invention in a retracted configuration.
Figure 4:
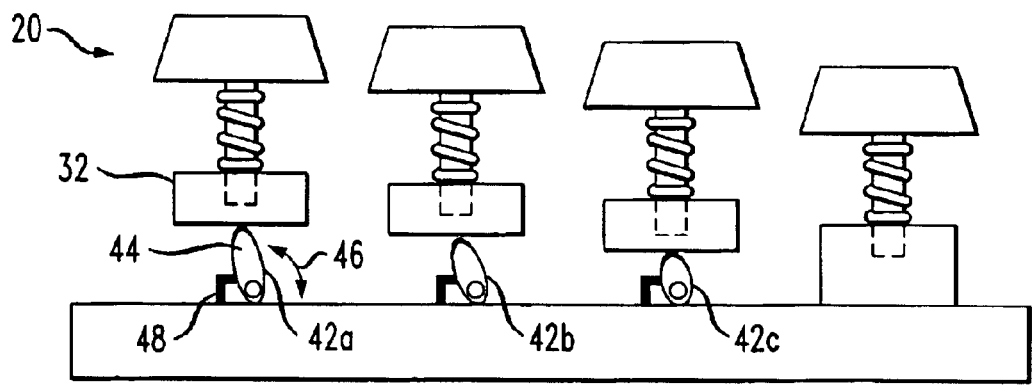
FIG. 4 is a side view diagram illustrating a keyboard in an extended configuration having sequentially tiered rows of keys in accordance with the invention.

Referring to FIGS. 3 and 4, a keyboard in accordance with the invention is shown generally at 20. The keyboard includes a body 21. The body 21 can be part of an electronic device. The keyboard also includes a plurality of keys 22 arranged in a plurality of rows 24 including a front row 24a which is typically disposed nearer the user (not shown) and a back row 24n. In FIG. 3, only several keys 22 forming part of the front row 24a are shown. It should be understood that in all of the illustrations contained herein, a column of keys is shown and, except for row 24a, only one key for each row is shown for simplicity.

The keys 22 each include a strike surface 26 which is struck by a user to depress the key. Typically a symbol (not shown), such as a letter, number, etc. is disposed on the strike surface 26 to indicate what symbol will be generated or communicated when the key 22 is struck.

The keys 22 are moveable between a home position, shown at 28, to a struck position shown with dashed lines at 29 in which the key is fully depressed. Typically, the keys 22 move vertically lower from the home position 28 to the struck position 29 when the user presses or strikes the keys. The symbol corresponding to the key 22 is generated or communicated in a known manner when the key reaches the struck position 29. Each of the keys preferably moves the same distance from the home position 28 to the struck position 29.

Each of the keys 22 also includes a shaft 30 extending from the key 22 into a base 32 for supporting the key. The base 32 receives the shaft 30 allowing it to move vertically thereby enabling the key to move between the home and struck positions 28, 29. Springs 34 are disposed about the shafts 30 between the keys 22 and the bases 32 to bias the keys 22 towards the home position 28.

The keyboard 20 also includes a lifter 40 disposed beneath the key 22 for moving to a lifted position to move the key vertically from a retracted configuration as shown in FIG. 3 to an extended configuration as shown in FIG. 4. With all rows of keys disposed in the retracted configuration, each of the rows of keys can be co-planar with the other rows and this configuration can be called the flat configuration. In the extended configuration, one or more rows of keys can be tiered with respect to the other rows as described in further detail below and this configuration can be called the tiered configuration. In the extended or tiered configuration, each key is capable of moving from the home position to the struck position when depressed by a user and from the struck position to the home position when released by the user. The lifter 40 can be locked in the lifted position to prevent the rows of keys from moving back to the retracted or flat configuration using any suitable known apparatus, an example of which is shown below.

A lifter 40 can be disposed beneath the base 32 of each key to move the keys individually to the extended configuration. Alternatively, all of the keys in a row, or in a group, can be moved together to utilize few lifters 40. For example, the bases 32 for all the keys 22 in a row 24, or group, can be joined together and one or more lifters 40 disposed beneath the joined bases can move the corresponding keys together.

The lifter 40 can be any suitable known apparatus for moving the keys 22. In one example, which should not be considered limiting, the lifter 40 is a cam having a lobe 42 with an eccentric surface 44. The lobe 42 contacts the base 32. The cam 40 can be rotated about an axis 45, as shown by the arrow 46 in FIG. 4, so that the lobe 42 lifts the bases 32 moving the keys 22 to the extended position as shown.

A stop 48 can be used to keep the cam in a suitable position which inhibits the cam from falling back to the horizontal position thereby locking the keys in the extended or tiered configuration. The stop prevents the cam from being over-rotated beyond the position intended to raise the keys. The stop can be connected to the keyboard body 21 or formed integral to the cam in any suitable know manner. Further, the cam can be rotated more than 90 degrees to keep the cam in the raised position to lock the keyboard in the extended or tiered configuration. For example, the axis of rotation 45 for the cam can be offset horizontally from the center of the base 32 so that the cam is rotated more than 90 degrees, such as for 100 to 110 degrees, when lifting the keys to the extended position.

Different lifters 40 can be used for different rows 24, with each lifter lifting the corresponding row a different height to achieve the tiered configuration. In the example provided, lobes 42a, 42b and 42c each have a different height for lifting the rows of keys different distances to the extended or tiered configuration. Each row of keys can be moved to a position higher than the preceding row, that is the row immediately in front of it, when moving from the front row to the back row to achieve a sequentially tiered configuration. As shown herein, the front row 24a, or any other suitable row or rows, may not be lifted such that the row or rows occupies the same position in the extended and retracted positions.

Figure 5:
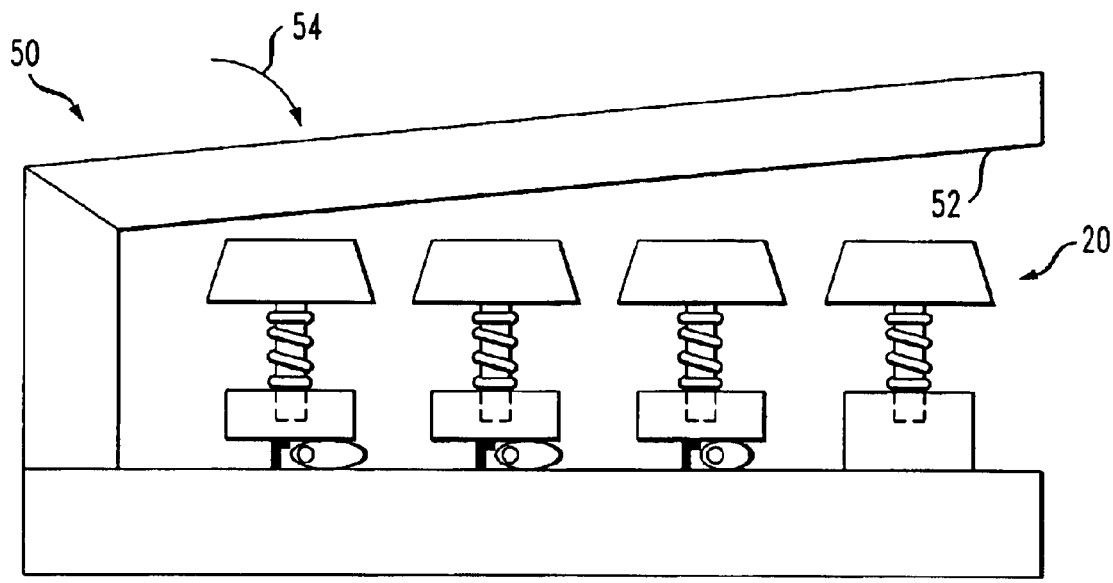
FIG. 5 is a side view diagram illustrating a portable electronic device with the keyboard in a retracted configuration in accordance with the invention.
Figure 6:
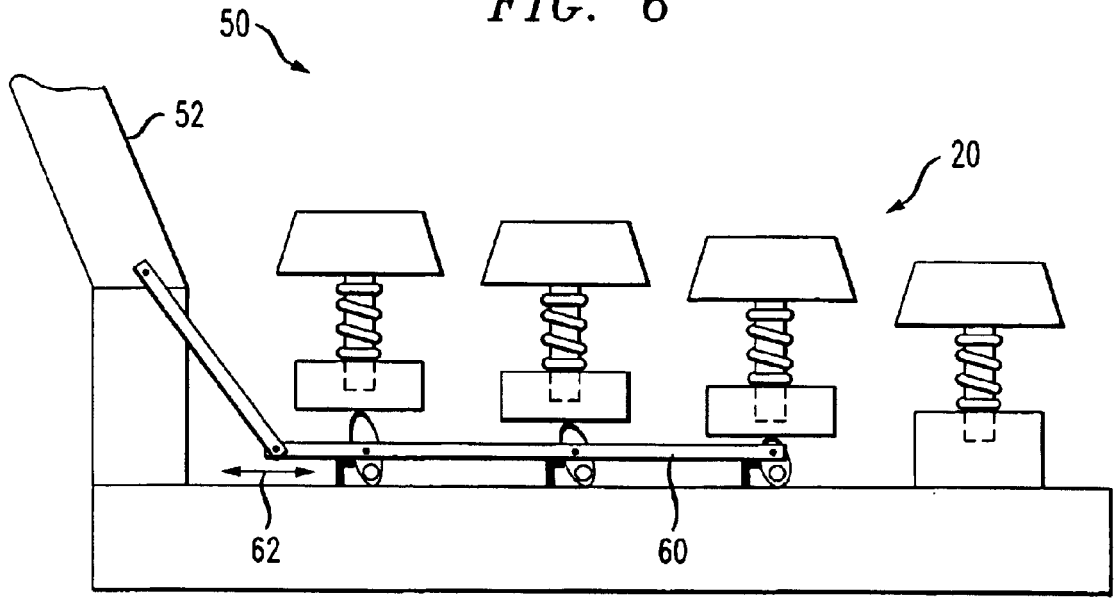
FIG. 6 is a side view diagram illustrating a portable electronic device with the keyboard in an extended configuration having sequentially tiered rows of keys in accordance with the invention.

Referring now to FIGS. 5 and 6, a portable computer, shown generally at 50, includes the keyboard 20. The portable computer 50 includes a display 52. In FIG. 5, the keyboard 20 is shown in the retracted or flat configuration so that the display 52 can be folded over, as shown by arrow 54, to cover the keyboard. In FIG. 6, the display 52 is opened to uncover the keyboard so that the computer may be used. The keyboard is shown in the extended or tiered configuration in which the keys can be moved between the home and struck positions to enter alphanumeric information into the computer.

The cams 40 for moving a single row, or group of keys, can be ganged together in any suitable known manner so that a single actuator can move the entire row. Further, as shown in FIG. 6, the cams 40 of all the rows or groups of keys can be ganged together to move in unison using a rod 60, so that moving the rod will rotate the ganged cams thereby moving the associated keys. The ganged cams can be connected to the cover, such as the display 52, to rotate the ganged cams and thus move the associated keys between the retracted and extended configurations when the cover is moved to cover or uncover the keys. In this manner, opening or closing the display 52 on a portable computer 50 will move the rod 60 as shown by the arrow 62 to extend or retract the keyboard accordingly.

Figure 7:
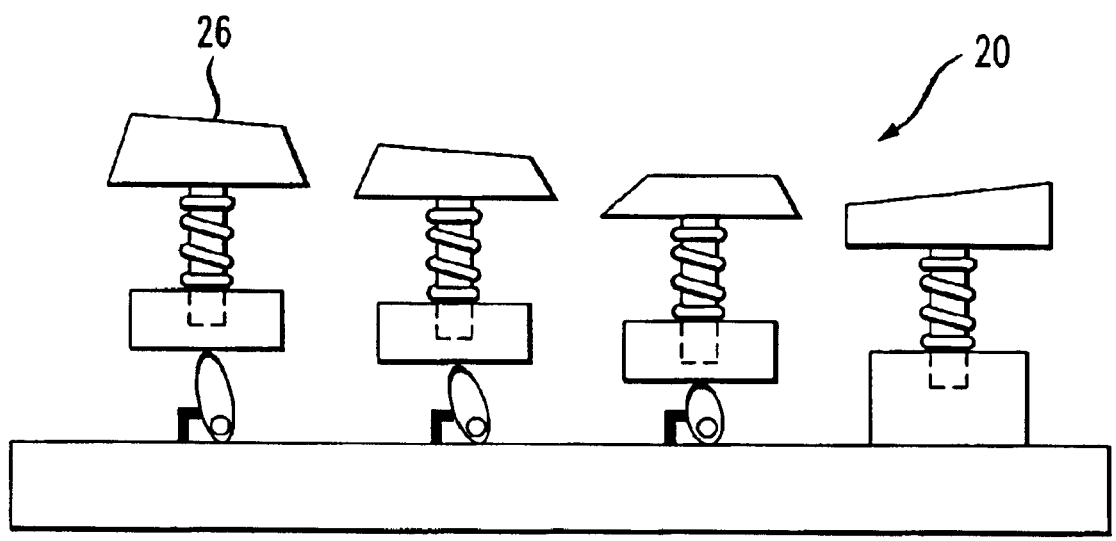
FIG. 7 is a side view diagram illustrating a keyboard in an extended configuration in accordance with the invention having contoured keys.

The strike surfaces 26 of the keys 22 may optionally be contoured, rather than being flat, as shown in FIG. 7. Therefore, the keys are in the flat configuration when the middles of all of the keys, determined in any suitable manner such as an average distance between the strike surface and the bottom, or the bottoms of the all of the keys are generally co-planer.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A keyboard comprising:
    keys movable between a home position and a struck position and arranged in a plurality of rows, the keyboard having a retracted configuration wherein the rows are generally coplanar with each other and an extended configuration wherein at least some of the rows of keys in the home position are extended from the retracted configuration such that the at least one or more rows are not coplanar with other rows; and
    lifter cams for cooperating with at least some of the keys having cam lobes for moving the at least some of the rows to the extended configuration.

2. The keyboard defined in claim 1 wherein at least some of the lobes have different heights for producing tiered rows in the extended configuration.

3. The keyboard defined in claim 2 wherein the keyboard includes a front row of keys and a back row of keys, and the rows are sequentially tiered in the extended configuration such that each row is higher than the preceding row moving from the front row to the back row.

4. The keyboard defined in claim 1 wherein at least some of the lifter cams are ganged together.

5. The keyboard defined in claim 4 further including a cover for covering the keyboard in the retracted configuration, wherein the ganged lifter cams are connected to the cover to move the at least some of the rows when the cover is moved.

6. The keyboard defined in claim 1 further comprising locking means for locking the at least some of the rows in the extended configuration.

7. An electronic device comprising:

a keyboard having keys movable between a home position and a struck position and arranged in a plurality of rows, the keyboard having a retracted configuration wherein the rows are generally coplanar with each other and an extended configuration wherein at least some of the rows of keys in the home position are extended from the retracted configuration such that at least one or more rows are not coplanar with the other rows;

lifters cooperating with at least some of the keys to move the at least some of the rows to the extended configuration; and a cover for covering the keyboard in the retracted configuration, wherein the lifters are connected to the cover to move the at least some of the rows when the cover is moved.

8. The electronic device defined in claim 7 wherein the keyboard includes a front row of keys and a back row of keys, and the rows are sequentially tiered in the extended configuration such that each row is higher than the preceding row moving from the front row to the back row.

9. The electronic device defined in claim 7 wherein the lifters are cams, each cam having a lobe, the cams being rotated such that the lobes move the at least some of the rows to the extended configuration.

10. The electronic device defined in claim 9 wherein the cams have lobes of different heights for producing tiered rows in the extended configuration.

11. The electronic device defined in claim 10 wherein the keyboard includes a front row of keys and a back row of keys, and the rows are sequentially tiered in the extended configuration such that each row is higher than the preceding row moving from the front row to the back row.

12. The electronic device defined in claim 7 wherein at least some of the lifters are ganged together.

13. The electronic device defined in claim 7 wherein the electronic device is a portable computer.

14. The electronic device defined in claim 7 further comprising locking means for locking the at least some of the rows in the extended configuration.

\* \* \* \* \*